United States Patent
Amin et al.

(10) Patent No.: US 10,966,150 B2
(45) Date of Patent: Mar. 30, 2021

(54) WAKE-UP SIGNAL WITH FREQUENCY INFORMATION

(71) Applicant: Telefonaktiebolaget LM Ericsson (publ), Stockholm (SE)

(72) Inventors: Parth Amin, Ahmedabad (IN); Luis Felipe Del Carpio Vega, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/477,949

(22) PCT Filed: Feb. 13, 2017

(86) PCT No.: PCT/EP2017/053108
§ 371 (c)(1),
(2) Date: Jul. 15, 2019

(87) PCT Pub. No.: WO2018/145768
PCT Pub. Date: Aug. 16, 2018

(65) Prior Publication Data
US 2019/0373549 A1    Dec. 5, 2019

(51) Int. Cl.
*H04W 52/02*    (2009.01)
(52) U.S. Cl.
CPC ... *H04W 52/0229* (2013.01); *H04W 52/0235* (2013.01); *H04W 52/0248* (2013.01)
(58) Field of Classification Search
CPC .............. H04W 52/0229; H04W 52/0235
USPC ....................................................... 370/311
See application file for complete search history.

(56) References Cited

U.S. PATENT DOCUMENTS

| 9,313,739 B2 | 4/2016 | Jafarian et al. |
| 2014/0112225 A1* | 4/2014 | Jafarian ............ H04W 52/0235 370/311 |
| 2016/0286599 A1* | 9/2016 | Weingertner ..... H04W 52/0216 |

FOREIGN PATENT DOCUMENTS

| CN | 106028369 A | 10/2014 |
| JP | 2015-149640 A | 8/2015 |

OTHER PUBLICATIONS

Notice of Preliminary Rejection for Korean Patent Application No. 10-2019-7023336 dated Mar. 24, 2020, 13 pages.
International Search Report and Written Opinion of the International Searching Authority, PCT/EP2017/053108, dated Nov. 2, 2017, 10 pages.

(Continued)

*Primary Examiner* — Peter G Solinsky
(74) *Attorney, Agent, or Firm* — Sage Patent Group

(57) ABSTRACT

The application relates to a method for operating a first wireless device (100) in a wireless network. At least one target wireless device (200) is determined which should receive a wake up signal by which a wake up receiver of the at least one target wireless device is informed that a main transceiver of the target wireless device should be ready for receiving at least a first message from the first wireless device, Furthermore a frequency is determined at which the at least first message should be transmitted to the at least one target wireless device, and a frequency information is encoded into the wake up signal with which at least one target wireless device is informed about the frequency at which the at least first message will be received. The wake up signal is transmitted with the encoded frequency information to the at least one target wireless device.

24 Claims, 10 Drawing Sheets

(56) References Cited

OTHER PUBLICATIONS

Minyoung Park et al., LP-WUR (Low-Power Wake-Up Receiver) Follow-Up, IEEE 802.11-16/0341r0, Mar. 14, 2016, 9 Pages.
Minyoung Park et al., Low-Power Wake-Up Receiver (LP-WUR) for 802.11, IEEE 802.11-15/1307r1, Nov. 10, 2015, 18 Pages.
Wen-Chan Shih et al., "A Long-Range Directional Wake-Up Radio for Wireless Mobile Networks", Journal of Sensor and Actuator Networks, ISSN 2224-2708, www.mdpi.com/journal/jsan, 2015, 19 Pages.
Minyoung Park et al., "Proposal for Wake-UP Receiver (WUR) Study Group", IEEE 802.11-16/0722r1, May 18, 2016, 14 Pages.
Notice of Reasons for Rejection dated Oct. 27, 2020, including English translation and comments, for Japanese Patent Application No. 2019-543363, 13 pages.
Dongguk Lim et al., "Consideration on WUR Frame Structure," LG Electronics, IEEE 802.11-17/0036r2, Jan. 2017, 9 pages.

* cited by examiner

WAKE-UP SIGNAL WITH FREQUENCY INFORMATION

This application is a 35 U.S.C. § 371 national stage application of PCT International Application No. PCT/EP2017/053108 filed on Feb. 13, 2017, the disclosure and content of which is incorporated by reference herein in its entirety.

TECHNICAL FIELD

The present application relates to a method for operating a first wireless device in a wireless network transmitting a wake-up signal to a target wireless device. The application furthermore relates to a method for operating the target wireless device and to the corresponding first wireless device and target wireless device. Additionally, a system comprising the target wireless device and the first wireless device, a computer program and a carrier are provided.

BACKGROUND

In the art wake-up receivers (WUR) are known which enable energy efficient data reception with only slightly increasing latency. A low power wake-up receiver can be provided in addition to a main transceiver which is turned off unless there is something to transmit or receive. The wake-up receiver wakes up the main transceiver when there is a message to be received. This message can be a data message or a control message. The main transceiver is used for the data transmission and reception. The wake-up receiver is a simple receiver and is primarily intended to turn on and off the main transceiver on a need basis. One field of application of wake-up receivers is in the technical field of WLAN and Wi-Fi. An access point in a wireless network can transmit a wake-up signal (WUS) to a wireless device. The WUS indicates that there is downlink data available for the specific wireless device. A wake-up receiver in the receiving wireless device can process the wake-up signals which carry a few bits of information, and the wake-up receiver wakes up the main transceiver only if an identifier section of the wake-up signal matches with an expected sequence of bits. Accordingly, the receiver recognizes in the sequence of bits its address and can thus determine that the WUS is intended for the receiving entity. U.S. Pat. No. 9,313,739 B discloses a format for the wake-up packet where the first part of the packet includes instructions to activate the receiver and the second part comprises instructions to execute selected actions in response to receiving the wake-up signal.

Additionally, a beacon frame can be signaled in the wake-up signal and a receiving device can reply to the received wake-up signal by sending a signal, a poll frame, an acknowledgement frame and can then enter a mode for uplink transmission without contention. An access point can also send a wake-up signal before the beacon which indicates incoming beacon and which may also indicate if a receiver is paged in the beacon. If a receiver is not paged in the beacon, it does not need to activate the main transceiver.

The MAC address used in Wireless Local Area Networks, WLAN, is 48 bits. In many examples, where less overhead is required the Association Identifier (AID) is used. The Association Identifier is a short length bitmap that represents addresses of wireless devices or broadcast/multicast addresses of group of wireless devices. By way of example the Association Identifier of zero can represent a multicast/broadcast address and a group of predefined wireless devices can be assigned to a selected Association Identifier. It is also possible to partially identify an address of a basic service set, BSS, using a few bits which is useful when multiple access point basic service sets are deployed.

In normal operation a WLAN wireless device needs to decode all frames. For downlink data, a wireless device identifies whether the downlink traffic is intended for itself or another wireless device by decoding the incoming frames. For uplink traffic, in OFDMA 802.11 ax, the wireless devices are scheduled using dedicated or random resources with a trigger frame, TF, or trigger frame random access, TF-R. In the standard 802.11ac and older standards, uplink transmission happens after performing listen before talk.

In a wireless system unicast and broadcast messages exist. These messages can carry data payload or control or management information such as the MAC payload. Examples of broadcast messages in WLAN are beacon frames, trigger frames or TIM (Traffic Indicator Map) frames.

A wireless device that intends to save power and should be reachable in downlink direction needs to wake-up periodically and decode beacon frames and/or TIM frames. TIM elements carried in these frames indicate that downlink data is available for wireless devices in a power save mode, and may be transmitted separately from the beacon frame.

The trigger frame, TF, was introduced in 802.11ax and is transmitted by the access point to enable multi-user uplink transmissions by the wireless devices without needing to do a channel sensing. In a similar way the access point may transmit a trigger frame random access, TF-R, where one or more wireless devices may compete for an uplink access on a specific resource unit.

Furthermore, narrowband (NB) WLAN/Wi-Fi is known which is based on IEEE 802.11ax and this technology may use carrier sense multiple access with collision avoidance (CSMA/CA), which is the case for a legacy Wi-Fi network. In the following WLAN and Wi-Fi are used interchangeably. A narrowband Wi-Fi device is expected to operate in a narrow channel band such as for example 2 MHz within the 2.4 GHz spectrum. A narrowband Wi-Fi device cannot decode legacy Wi-Fi transmissions transmitted on a broader channel bandwidth of 20 MHz and in the same way a legacy Wi-Fi wireless device cannot decode the narrowband Wi-Fi transmissions. This, however, means that a narrowband wireless device cannot perform channel sensing for the transmissions from a legacy Wi-Fi and may have to rely on energy detection thresholds to decode a legacy transmission. In the same way, legacy wireless devices may also have to rely on energy detection thresholds to detect a narrowband Wi-Fi transmission. This problem is not restricted to Wi-Fi, but applies to each wireless network where some of the wireless devices are operating in a narrow band and cannot operate in the full bandwidth and there are wireless legacy devices operating in the full bandwidth which cannot operate in the narrow band in the wireless network. A narrowband wireless device has to wait to receive a trigger frame or a trigger frame random access, TF-R, transmission from an access point to transmit its uplink traffic as it is not able to perform reliable carrier sensing. As a consequence, a narrowband wireless device may not perform an uplink channel access and will wait for the transmission of the trigger frame or TF-R from the access point to transmit the uplink traffic. A narrowband wireless device might receive the trigger frame or TF-R always on the same frequency which restricts the flexibility in frequency domain, or might scan different frequencies to locate the trigger frame or TF-R. This, however, means that scanning for the trigger frame or TF-R or wait for the trigger frame or TF-R on a fixed frequency consumes unnecessary power in the narrowband wireless device.

SUMMARY

Accordingly, a need exists to provide a wireless device in a wireless network which consumes less power.

This need is met by the features of the independent claims. Further aspects are described in the dependent claims.

According to a first aspect a method for operating a first wireless device in a wireless network is provided which determines at least one target wireless device which should receive a wake-up signal by which a wake-up receiver of the at least one target wireless device is informed that a main transceiver of the target wireless device should be ready for receiving at least a first message from the first wireless device. The first wireless device furthermore determines a frequency at which the at least first message should be transmitted to the at least one target wireless device. Additionally, a frequency information is encoded into the wake-up signal with which the at least one target wireless device is informed about the frequency at which the at least first message will be received. The wake-up signal is then transmitted with the encoded frequency information to the at least one target wireless device.

When the frequency information is encoded into the wake-up signal the receiving wireless device, the target wireless device, can be informed about a frequency at which a further data exchange between the first wireless device and the target wireless device can occur. Accordingly, the main transceiver of the target wireless device can be tuned taking into account the received frequency information. The target wireless device knows about the frequency of the upcoming data exchange. Accordingly, there is no need for the target wireless device to scan the frequency band if possible at all. Especially for a narrowband target wireless device which is not able to scan the complete available frequency bands available in the wireless network at the same time, the target wireless device does not have to wait to receive a trigger from the first wireless device, the sending wireless device, as the target wireless device, the receiving wireless device knows in which frequency range a data exchange will occur. As a scanning of the frequency band or a part of the frequency band can be omitted, the power consumption and latency is further reduced.

Additionally, the corresponding first wireless device is provided which comprises a memory and at least one processor wherein the memory contains instructions executable by the at least one processor wherein the first wireless device is operative to carry out the steps mentioned above and explained in more detail below.

Furthermore, a method for operating the target wireless device in the wireless network is provided wherein the target wireless device comprises at least a wake-up receiver and a main transceiver. The target wireless device receives the wake-up signal from the first wireless device of the wireless network and determines whether the received wake-up signal is intended for the target wireless device receiving the wake-up signal. If this is the case, the inactive main transceiver of the target wireless device is activated and a frequency information present in the wake-up signal is decoded by which the target wireless device is informed about the frequency at which at least a first message will be received from the first wireless device. The main transceiver can be activated and can be tuned to the frequency deduced from the frequency information.

As discussed above in connection with the first wireless device, the receiving wireless device, the target wireless device, can use the encoded frequency information and the main transceiver can be directly tuned to the desired frequency. This has the advantage that the frequency band has not to be searched. Furthermore, when the main transceiver is not able to search the complete frequency band in the wireless network, the target wireless device does not have to care about possible other frequency bands used in the wireless network as it knows that the data exchange with the first wireless device will occur in the frequency deduced from the frequency information in the wake-up signal.

Additionally, the target wireless device is provided which comprises the wake-up receiver, the main transceiver, a memory and at least one processor wherein the memory comprises instructions executable by the at least one processor wherein the target wireless device is operative to carry out the steps of the target wireless device mentioned above or explained in more detail below.

The target wireless device can also comprise a module for receiving the wake-up signal from the first wireless device and a module for determining whether the received wake-up signal is intended for the target wireless device. The target wireless device can furthermore comprise a module for activating the inactive main transceiver and a module for decoding the frequency information present in the wake-up signal and a module for tuning the main transceiver to the frequency deduced from the frequency information.

The first wireless device can comprise a module for determining at least one target wireless device which should receive the wake-up signal and a module for determining a frequency at which the at least first message should be transmitted to the target wireless device. The first wireless device may furthermore comprise a module for encoding a frequency information into the wake-up signal and a module for transmitting the wake-up signal with the encoded frequency information to the target wireless device.

Furthermore, a system comprising the target wireless device and the first wireless device is provided.

Furthermore, a computer program comprising program code to be executed by at least one processor of the first wireless device or the target wireless device is provided wherein execution of the program code causes the at least one processor to execute a method discussed above in the first wireless device or target wireless device or as explained in further detail below. Additionally, a carrier comprising the computer program is provided wherein the carrier is one of an electronic signal, optical signal, radio signal or computer readable storage medium.

It is to be understood that the features mentioned above and features yet to be explained below can be used not only in the respective combinations indicated, but also in other combinations, or in isolation without departing from the scope of the present application. Features of the above mentioned aspects and embodiments may be combined with each other in other embodiments unless explicitly mentioned otherwise.

BRIEF DESCRIPTION OF THE DRAWINGS

The foregoing and additional features and effects of the application will become apparent from the following detailed description when read in conjunction with the accompanying drawings in which like reference numerals refer to like elements.

DETAILED DESCRIPTION OF EMBODIMENTS

Figure 1:
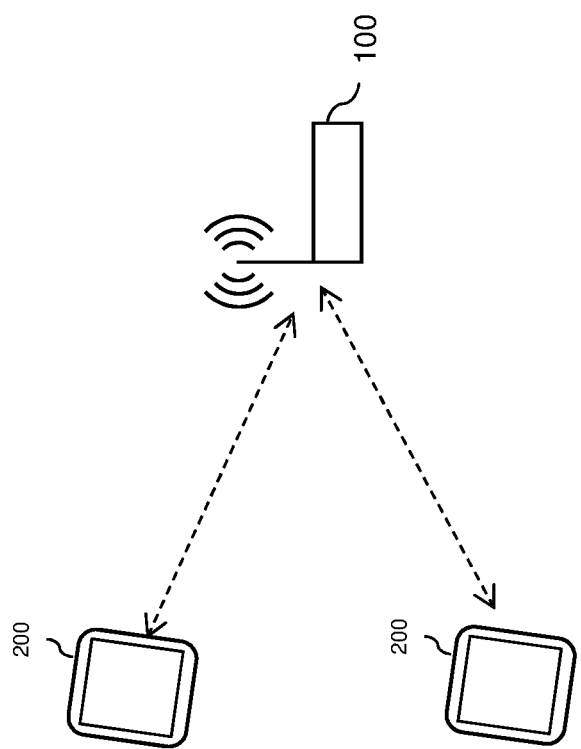
FIG. 1 shows an example architecture view of a system including a first wireless device and a target wireless device in which the target wireless device receives a wake-up signal including frequency information.

In the following embodiments of the application will be described in detail with reference to the accompanying drawings. It is to be understood that the following description of embodiments is not to be taken in a limiting sense. The scope of the application is not intended to be limited by the embodiments described hereinafter or by the drawings, which are to be illustrative only.

The drawings are to be regarded as being schematic representations, and elements illustrated in the drawings are not necessarily shown to scale. Rather the various elements are represented such that their function and general purpose becomes apparent to a person skilled in the art. Any connection or coupling between functional blocks, devices, components or physical or functional units shown in the drawings and described hereinafter may also be implemented by an indirect connection or coupling. A coupling between components may be established over a wired or wireless connection. Functional blocks may be implemented in hardware, software, firmware, or a combination thereof.

FIG. 1 shows a schematic view of a wireless network in which a first wireless device 100 communicates with other wireless devices, the target wireless devices 200. The first wireless device can be an access point (for example in a Wireless Local Area Network, WLAN or a base station). The target wireless devices 200 can refer to devices used by a person or user for his or her personal communication. It can be a telephone type of device, or a personal digital assistant type of device like laptop, notebook, notepad, tablet with a wireless data connection. The wireless device can also be a wireless device used in the context of the Internet of Things (IoT). By way of example the wireless device may be a narrowband wireless device attached to another equipment wherein the wireless device transmits data related to the equipment to which it is connected to the first wireless device or access point 100, and/or receives control information for the equipment from the first wireless device. The wireless device can be a smart meter or any other device transmitting data. The wireless devices 200 can operate in a narrower channel bandwidth such as 2 MHz compared to the full bandwidth of e.g. 20 MHz which corresponds to the full bandwidth used the wireless network (for example by the first wireless device). Thus the wireless device can search the full bandwidth by sub-bands but not all frequencies at the same time. The wireless network can be a WLAN or Wi-Fi network or any other similar network such as Bluetooth Low Energy, 802.15.4e. The wireless devices 200 may be configured such that they cannot search the complete frequency spectrum which is allowed for communication in the wireless network.

As will be explained below in connection with FIG. 11 the wireless devices 200 comprise a main transceiver which is used for the data communication with the first wireless device or access point 100. Furthermore, each of the wireless devices 200 comprise a wake-up receiver which is primarily intended to turn on the main transceiver on a need basis. The wake-up receiver is designed as a simple receiver which just checks the wireless network for the reception of wake-up signals in a certain frequency range. If a wake-up signal is detected by the wake-up receiver it detects whether the received signal is intended for the own wireless device, e.g. based on an address contained in the wake-up signal. If the own wireless device is addressed the wake-up receiver can wake-up the main transceiver which then is responsible for data reception and data transmission.

Figure 2:
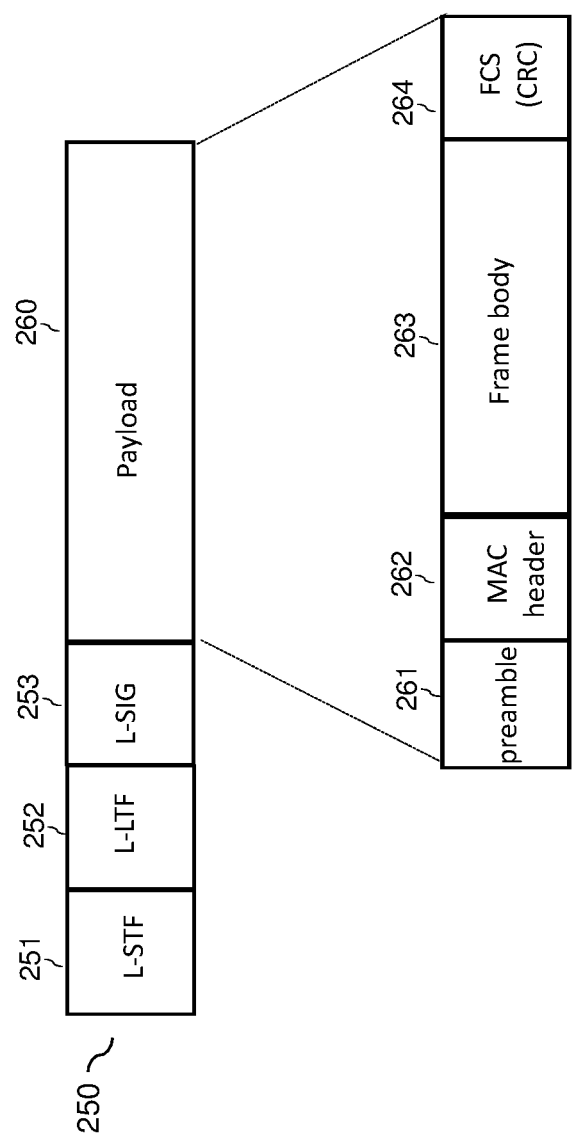
FIG. 2 shows a schematic example structure of a wake-up signal used in the communication between the two wireless devices shown in FIG. 1.

As will be explained in further detail below a wake-up signal generated by the wireless device 100 is designed and extended in such a way that it also indicates information related to the future frame transmission by the wireless device 100 on a specific resource unit or a specific target time. Furthermore, the wake-up signal can be generated such that it indicates the availability of downlink data for the target wireless device. As shown in FIG. 2 the wake-up signal can contain a first part 250 and a payload part 260. The first part 250 can comprise a legacy short training field 251, a legacy long training field 252 and a legacy signal field 253. As indicated in FIG. 2, the payload part 260 can comprise a wake-up preamble 261, the MAC (Medium Access Control) header 262, a frame body 263 and a frame check sequence 264. As will be explained below a frequency and/or time information will be included into the wake-up signal. By way of example the frequency and/or time information can be included into the frame body 263 of the wake-up signal.

Different examples of how the wake-up signal transmitted by the first wireless device 100 are explained in connection with FIG. 3-7. In these figures the first wireless device 100 is indicated as access point, short AP, or transmitter wherein the different target devices to which the wake-up signal is transmitted are named as device x and device y.

Figure 3:
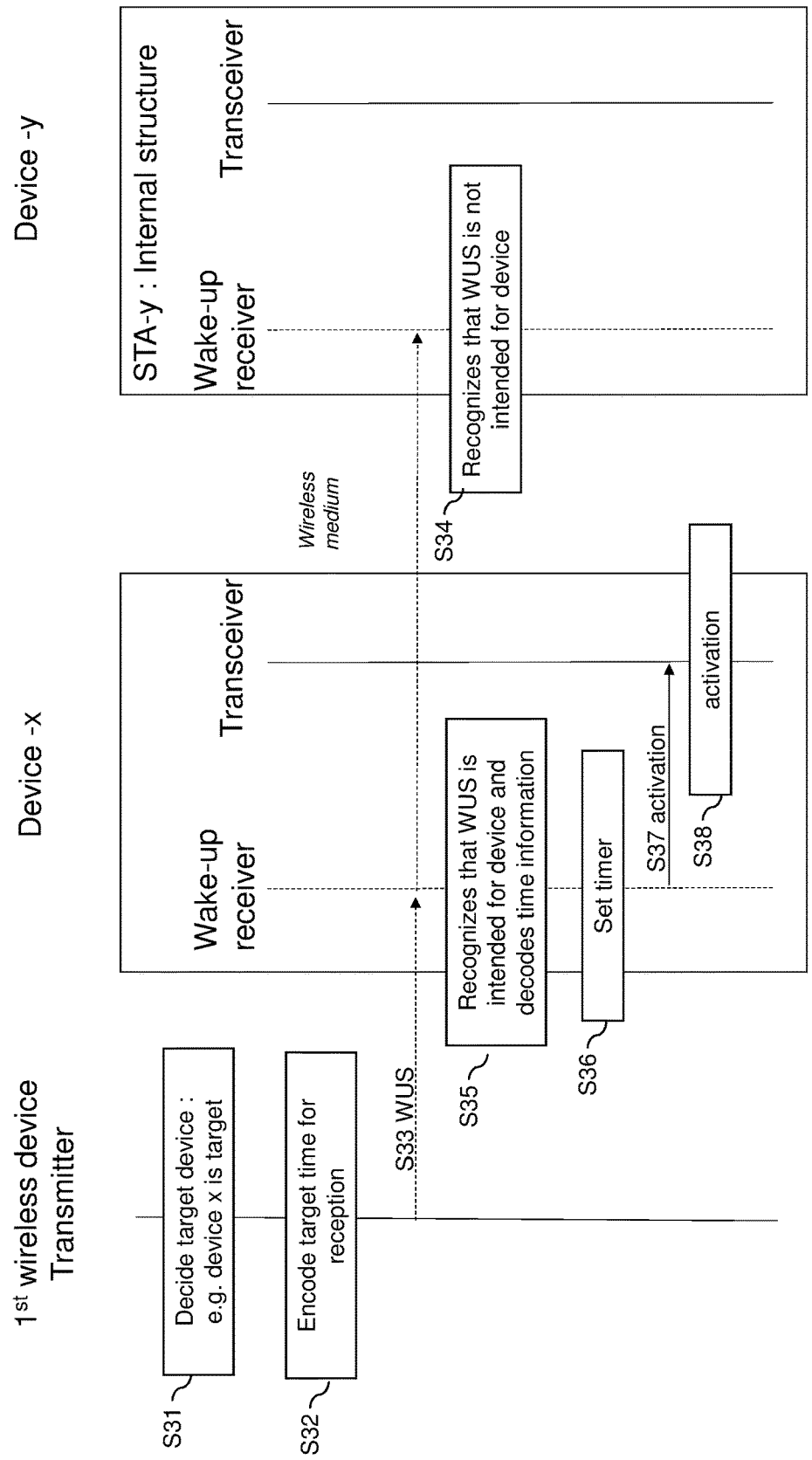
FIG. 3 shows an example message flow between a first wireless device as transmitting device and two other wireless devices wherein time information is included into the wake-up signal.

In connection with FIG. 3 an example is explained in which time information is encoded into the wake-up signal which can be used to activate the main transceiver of one or more target wireless devices at a desired point in time. At step S31 the first wireless device or transmitter determines the one or more target wireless device. In the example shown it is the wireless device x to which a wake-up signal should be transmitted. In step S32 a time information is encoded into the wake-up signal, by way of example the target time for reception of the future transmission via the main receiver. In this step the approximate time may be determined at which the access point will start a transmit process of the next frame to the receiving device x. By way of example the information may be encoded that the access point plans to transmit a trigger frame for the wireless device x in 5 ms. This approximate time is then encoded as time information in the WUS for example as a difference from the approximate transmission time of the frame minus the transmission time of the wake-up signal. In step S33 the wake-up signal, WUS, with the encoded time information is transmitted. This signal can be detected by the wireless device x and by wireless device y. Wireless device y determines in step S34 that it is not the intended recipient of the signal so no further actions are performed by wireless device y. In step S35 the wireless device x recognizes that the signal is intended for it and decodes the time information present in the wake-up signal. The target time can be the time of the reception of the wake-up signal plus a target time delta which corresponds to the difference of the transmission time for the next frame minus the transmission time of the wake-up signal. In step S36 a timer (for example implemented as a counter) may be set which can expire at the determined target time. When the timer has expired at the target time the wake-up receiver informs the main transceiver that it should wake-up as shown in step S37. This is one possible implementation how the main transceiver could be activated. Another example would be the inclusion of an absolute target time wherein the transceiver is activated when this absolute target time is reached. In step S38, the transceiver can then be activated.

Figure 4:
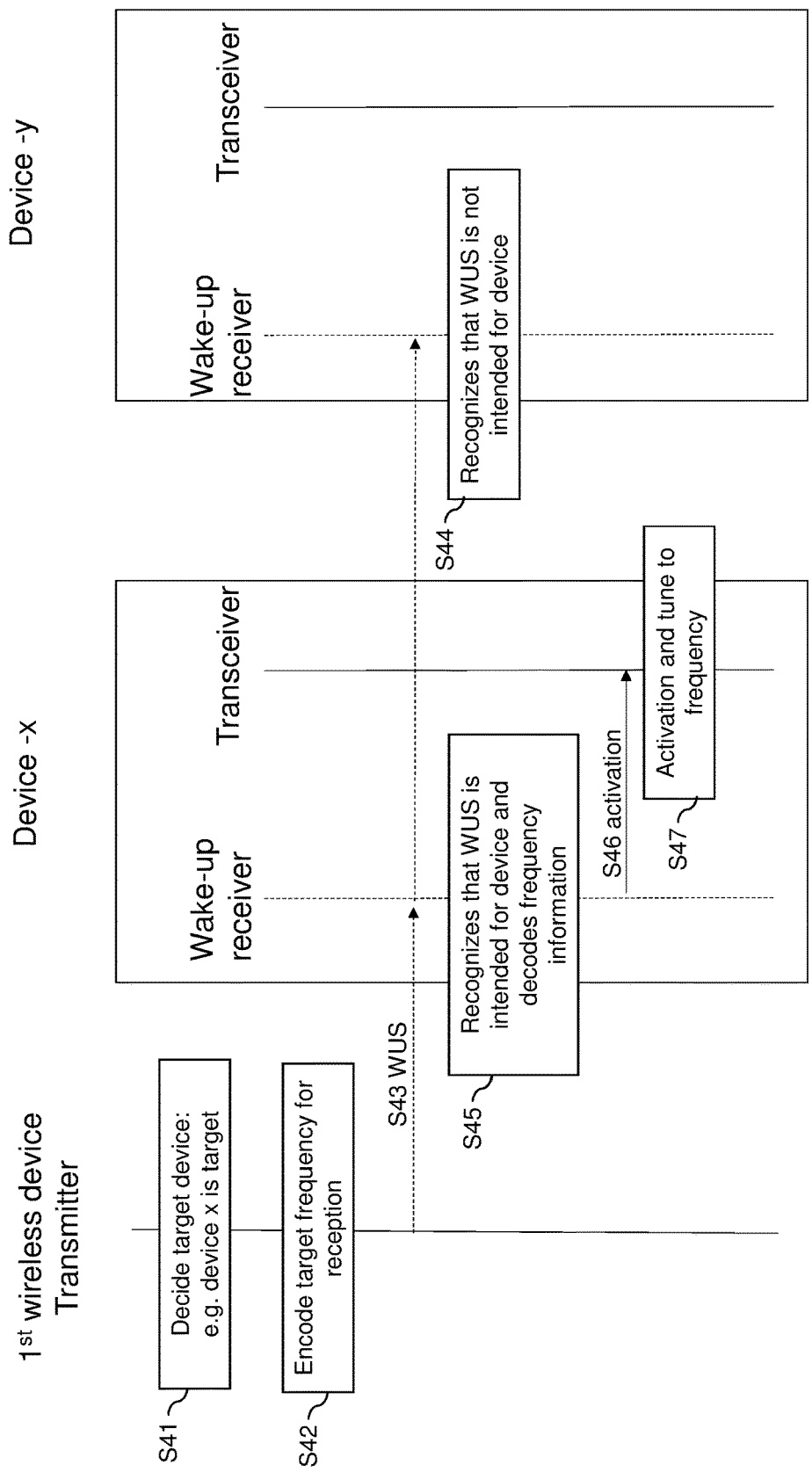
FIG. 4 shows an example message flow between the entities shown in FIG. 1 in which the transmitting wireless device includes frequency information into the wake-up signal.

In connection with FIG. 4 another example is discussed in more detail. In the example of FIG. 4 a frequency information is encoded into the wake-up signal. In step S41, the access point determines a target device (or a group of target devices, not shown n FIG. 4) to which a wake-up signal and later on other data should be transmitted. In step S42 a target frequency is encoded into the wake-up signal which indicates at which frequency the other data will be transmitted from the access point to the target wireless device. By way of example the frequency domain point or resource unit may be included into the wake-up signal at which transmission of the other data to the target wireless device x will be done. To this end information about the resource unit that will be utilized for the transmission of a frame to the target wireless device can be obtained, by way of example the frequency information can encode the information that the access point plans to transmit a message or a frame on a certain resource unit. This resource unit information can then be encoded into the wake-up signal. Here an absolute encoding may be used, by way of example the resource unit or the frequency may be indicated by a number. Furthermore, an encoding using a delta may be used where the delta may be defined with reference to the wake-up signal which is transmitted to the wireless device or with reference to a defined frequency.

As indicated in connection with FIG. 1 the wireless devices x and y may not be able to operate in the complete frequency range in which information is transmitted in the wireless network. However, the access point can be aware of the narrowband frequency ranges at which the wireless devices are able to transmit and receive information. Accordingly, already the wake-up signal may be a narrowband signal transmitted in a frequency band the wireless devices are able to monitor.

When the frequency difference (the delta) is encoded a positive or negative delta with different magnitudes may be encoded into the wake-up signal. When the wake-up signal uses for example sub-band or sub-channel 4 and the next message or next frame will be transmitted in sub-band or sub-channel 1, the delta may be −3. When the delta is 0 this may mean that the next frame to be received after the wake-up signal will be transmitted at the same frequency as the wake-up signal was transmitted. The wake-up signal is then transmitted by the access point in step S43. In the example the wake-up signal was dedicated for wireless device x. As a consequence in step S44 the wireless device y does not recognize its address and thus follows that it is not the intended recipient of the message. In step S45, however, the wireless device x recognizes its address and decodes the frequency information. The wake-up receiver then wakes up the main transceiver in step S46, and in step S47 the main transceiver is activated and the main transceiver tunes to the frequency deduced from the frequency information. In the example mentioned above the wake-up receiver decodes the frequency information. However, it is also possible that the wake-up receiver only decodes the address in order to keep the operation at the wake-up receiver simple and in order to keep the energy consumption at the wake-up receiver low. When the wake-up receiver determines that the wake-up signal is intended for itself it may forward either the complete wake-up signal or the part of the wake-up signal including the encoded frequency information to the transceiver and the transceiver will be responsible for the decoding of the frequency information.

Figure 5:
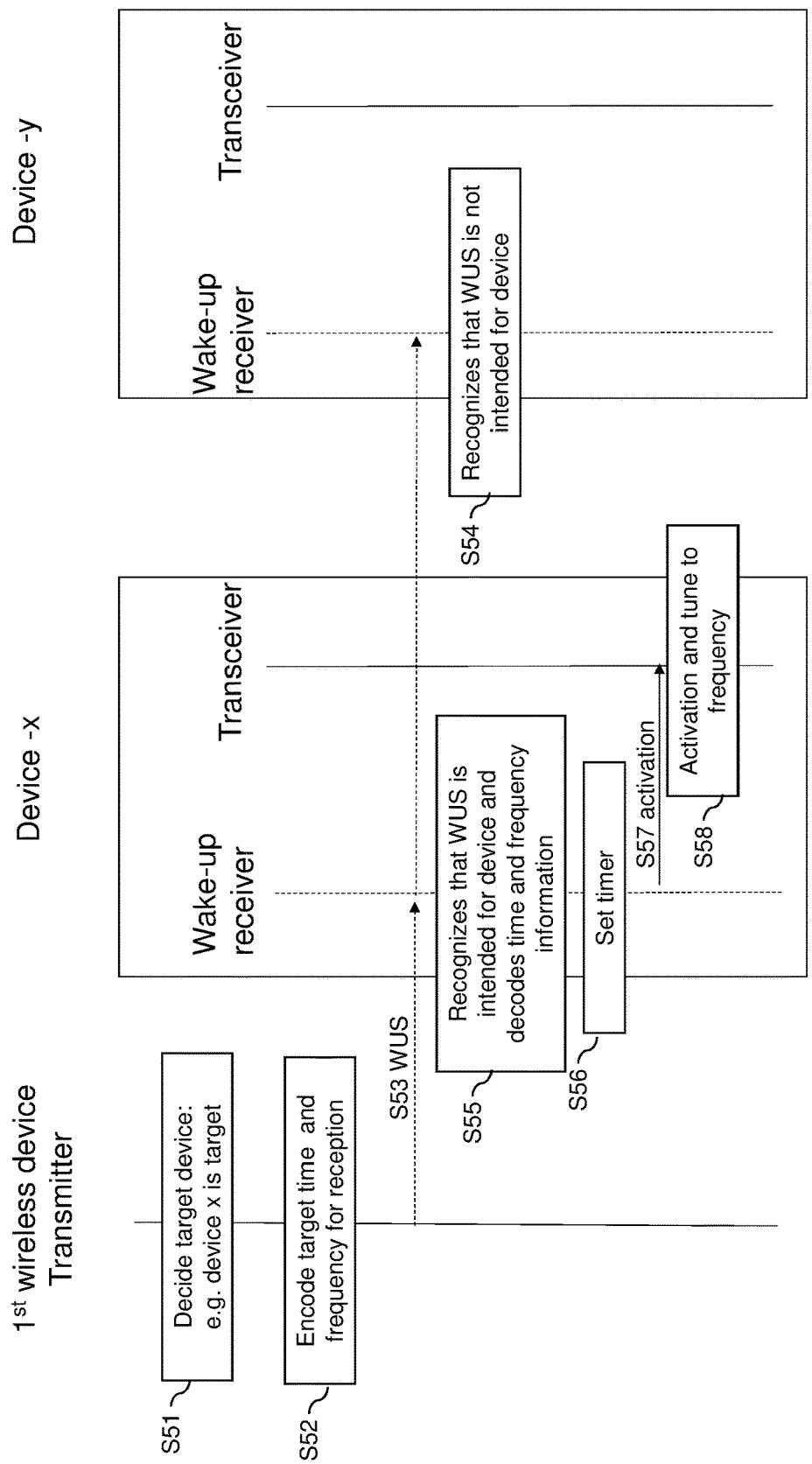
FIG. 5 shows an example message flow between the entities shown in FIG. 1 wherein the transmitting wireless device includes time and frequency information into the wake-up signal.

In connection with FIG. 5 an example is explained in which the access point encodes a frequency and time information into the wake-up signal. Step S51 is analogue to steps S41 and S31 and describes the step of determining to which wireless device (or group of wireless devices) a message should be transmitted. In step S52 the time can be determined where the access point will transmit the next message or data to the receiving wireless device, and the information about the frequency information can be obtained that will be utilized for the transmission of the next message.

By way of example the information may be encoded into the wake-up signal that the access point plans to transmit a next message, e.g. a trigger frame to wireless device x in 5 ms on a defined resource unit. The frequency and time information is then encoded into the wake-up signal and in step S53 the wake-up signal is transmitted to the target wireless device. In step S54 a wireless device y determines that it is not the correct recipient of the message whereas wireless device x determines that it is the intended recipient and decodes the time and frequency information contained in the wake-up signal (step S55). In step S56 the timer is set to the target time determined based on the time information and when the timer has expired the wake-up receiver informs in step S57 the main transceiver that it should be activated. The time and frequency information may already be decoded by the wake-up receiver and transmitted in a decoded form to the main transceiver. Alternatively frequency information may be forwarded without processing to the main transceiver which then processes the received information and activates itself and tunes to the frequency contained in the frequency information (step S58).

Figure 6:
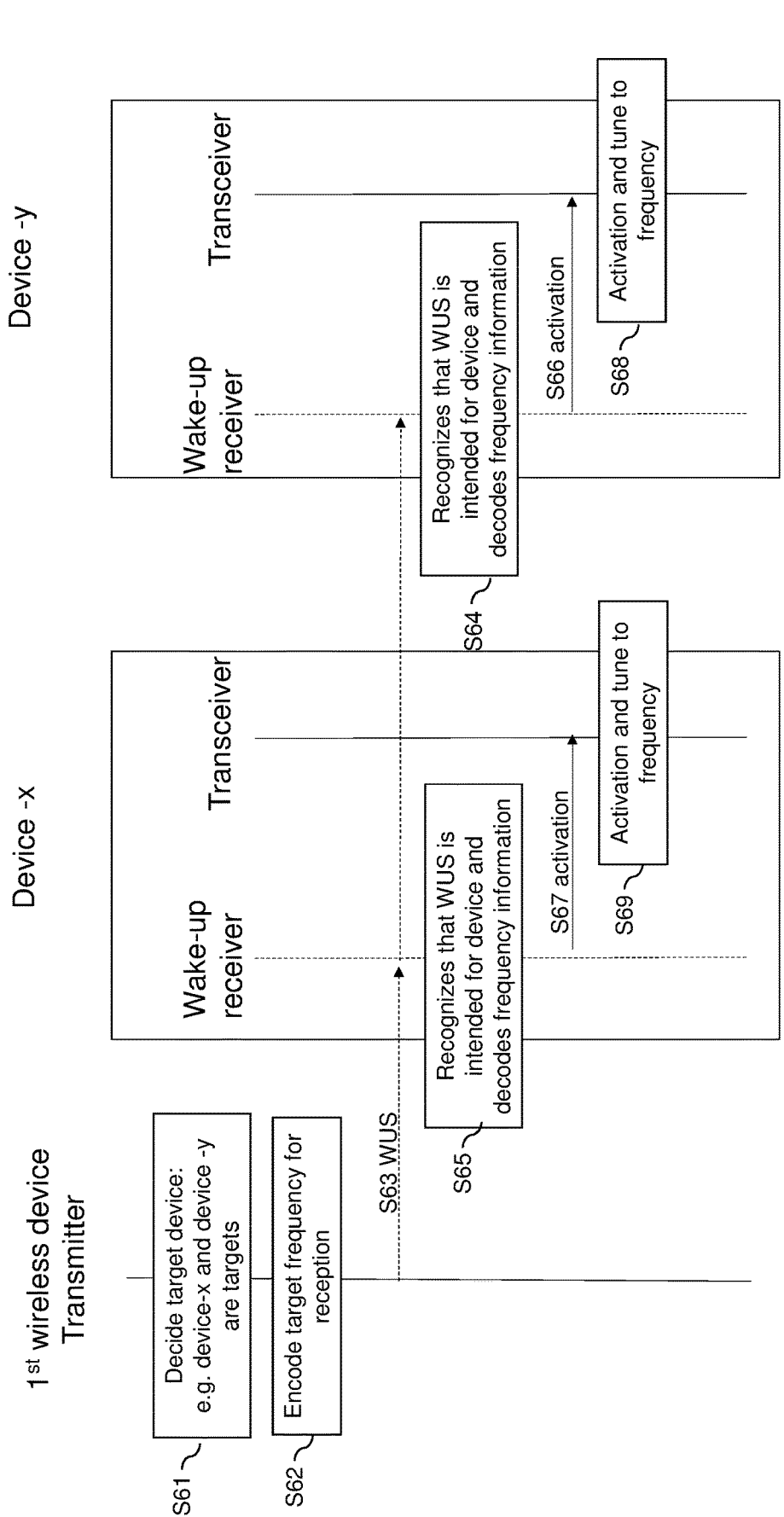
FIG. 6 shows an example message flow between the entities shown in FIG. 1 wherein the transmitting wireless device generates a wake-up signal including frequency information dedicated for both wireless devices.

FIG. 6 describes an embodiment where the wake-up signal is dedicated for both wireless devices x and y. In step S61 the access point determines to which wireless device or wireless devices the available data provided in a buffer should be transmitted. In the example shown it is device x and device y. Together with the destination indication (for example one or more addresses of the target wireless devices or one or more group addresses of the target wireless devices) which indicate that all wireless devices or a certain group of wireless devices should be addressed a target frequency information is encoded into the wake-up signal in step S62. Step S62 can correspond to step S42 discussed in connection with FIG. 4. The wake-up signal with the encoded frequency information is then transmitted in step S63. Both wireless devices recognize that they are the right recipient in steps S64 and S65, and both wireless devices decode the frequency information contained in the wake-up signal. In steps S66 and S67 the corresponding wireless devices transmit messages to the main transceiver to wake-up the main transceiver and in steps S68 and S69 the corresponding main transceivers are activated and tuned to the corresponding frequency contained in the wake-up signal. As discussed in more detail above, the main transceiver itself may decode the frequency information or the wake-up receiver may at least partially do it and transmit the part of the signal containing the frequency information to the transceiver or may already transmit the decoded frequency information to the main transceiver.

Figure 7:
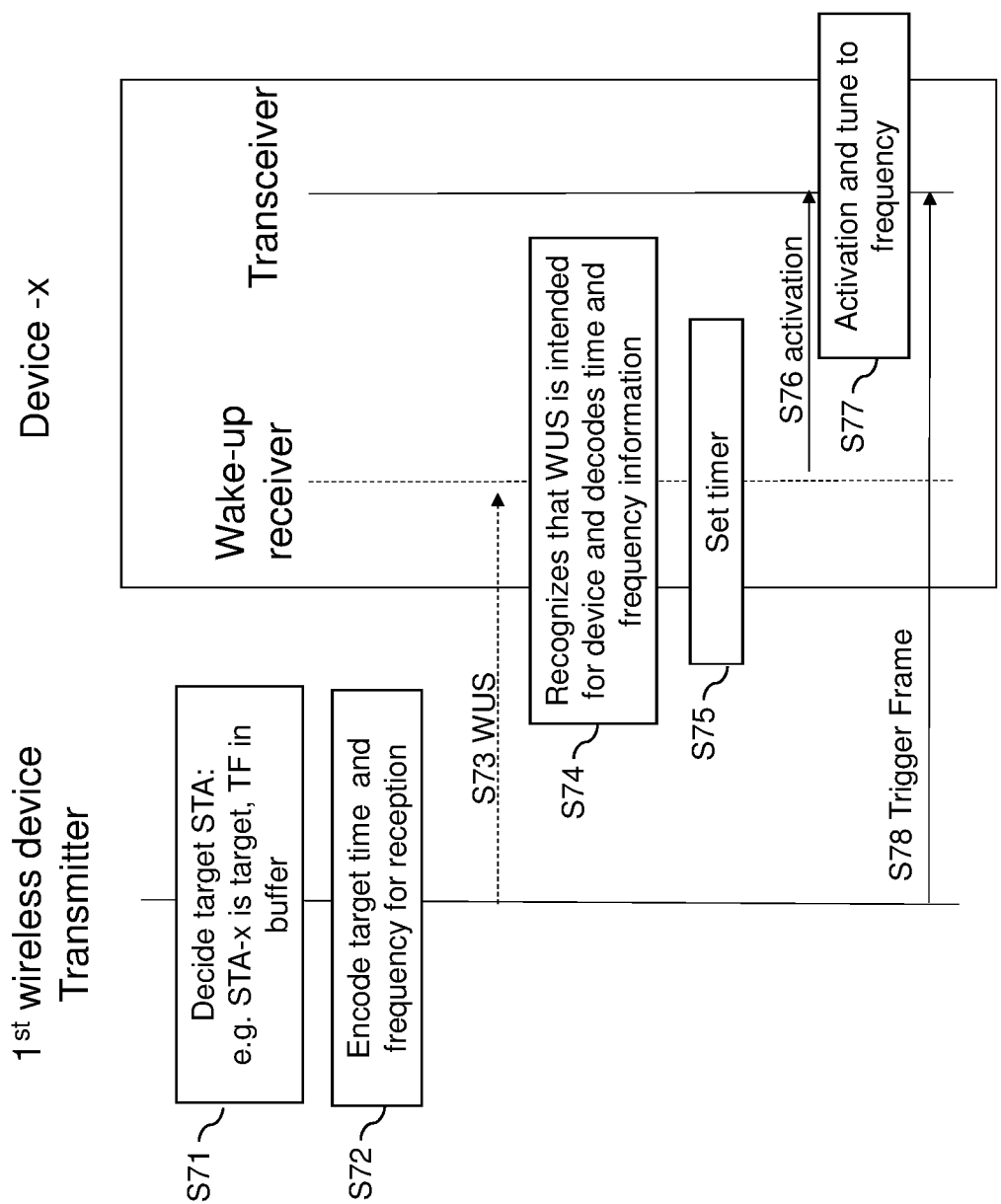
FIG. 7 shows an example schematic message flow wherein frequency information is encoded into the wake-up signal and wherein the transmitting wireless device transmits a trigger frame to the wireless device at the indicated time and frequency.

In connection with FIG. 7 an embodiment is disclosed where the access point additionally includes information into the wake-up signal which type of frame can be expected by the receiving wireless device. In step S71 the access point decides which wireless device (or group of wireless devices) will be the recipient of the wake-up signal. Furthermore, a trigger frame is provided in the transmit buffer of the access point so that in step S72 the access point can encode, in addition to the frequency information and/or the target time information that a trigger frame will be transmitted. The wake-up signal with the encoded information is then transmitted in step S73. Wireless device x then recognizes that the wake-up signal is intended for it and decodes at least the time information in step S74. In step S75 the timer is set and when the timer is expired the main transceiver is informed that data will be received from the access point (step S76). In step S77 the main transceiver is activated and the main transceiver tunes to the decoded frequency information. In step S78 the trigger frame is transmitted by the access point at the indicated time and with the indicated frequency. If the receiving wireless device does not receive the indicated frame within a predefined time period, the main transceiver can be again inactivated. The predefined time period the main transceiver waits for the reception of the indicated frame type maybe in the range of milliseconds (e.g. 1 ms or 2 ms).

Figure 8:
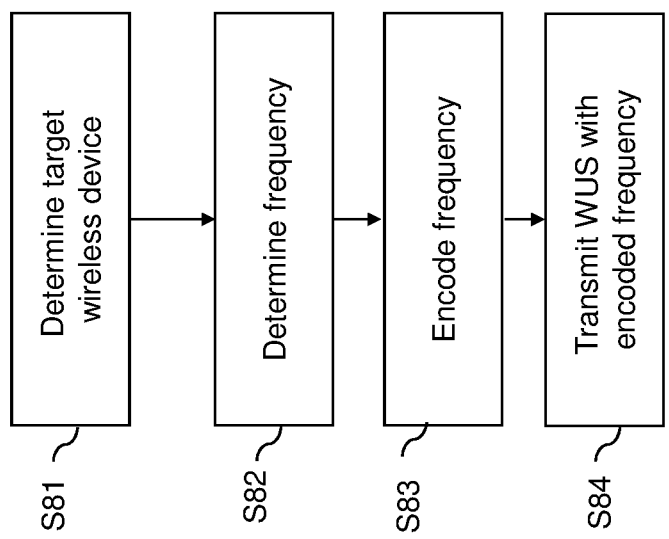
FIG. 8 shows an example flowchart of a method carried out by a first wireless device which encodes the frequency information into the wake-up signal.

FIG. 8 summarizes some of the steps carried out by the first wireless device or access point 100 carried out in the different examples discussed above. In a step S81 the first wireless device determines at least one target wireless device which should receive a wake-up signal to inform the target wireless device of an upcoming data exchange. In step S82 the frequency for the upcoming data exchange is determined, e.g. the resource unit, at which a future data exchange with the target wireless device should be carried out. In step S83 the frequency information is encoded into the wake-up signal. The frequency information can be included into the frame body 263 shown in FIG. 2, however, the frequency information may be included in any other part of the wake-up signal. Furthermore, it should be understood that the wake-up signal may be designed differently than shown in FIG. 2. In addition to the frequency it is possible to include further pieces of information into the wake-up signal. As discussed above it is additionally possible to include a target time. This target time can be the time at which the transmitting device starts the process of transmission, which may be when the transmitting device starts channel sensing for transmission. As an alternative or in addition the transmitting device may include information into the wake-up signal which kind of message or which kind of data frame the next piece of information will be that is transmitted from the transmitting wireless device to the target wireless device. In step S84 the wake-up signal with the encoded information is transmitted to the target wireless device. As discussed above, the target wireless device may be a single wireless device or in a broadcast or multicast situation the target wireless device may include a group or all wireless devices which are connected to the transmitting wireless device.

Figure 9:
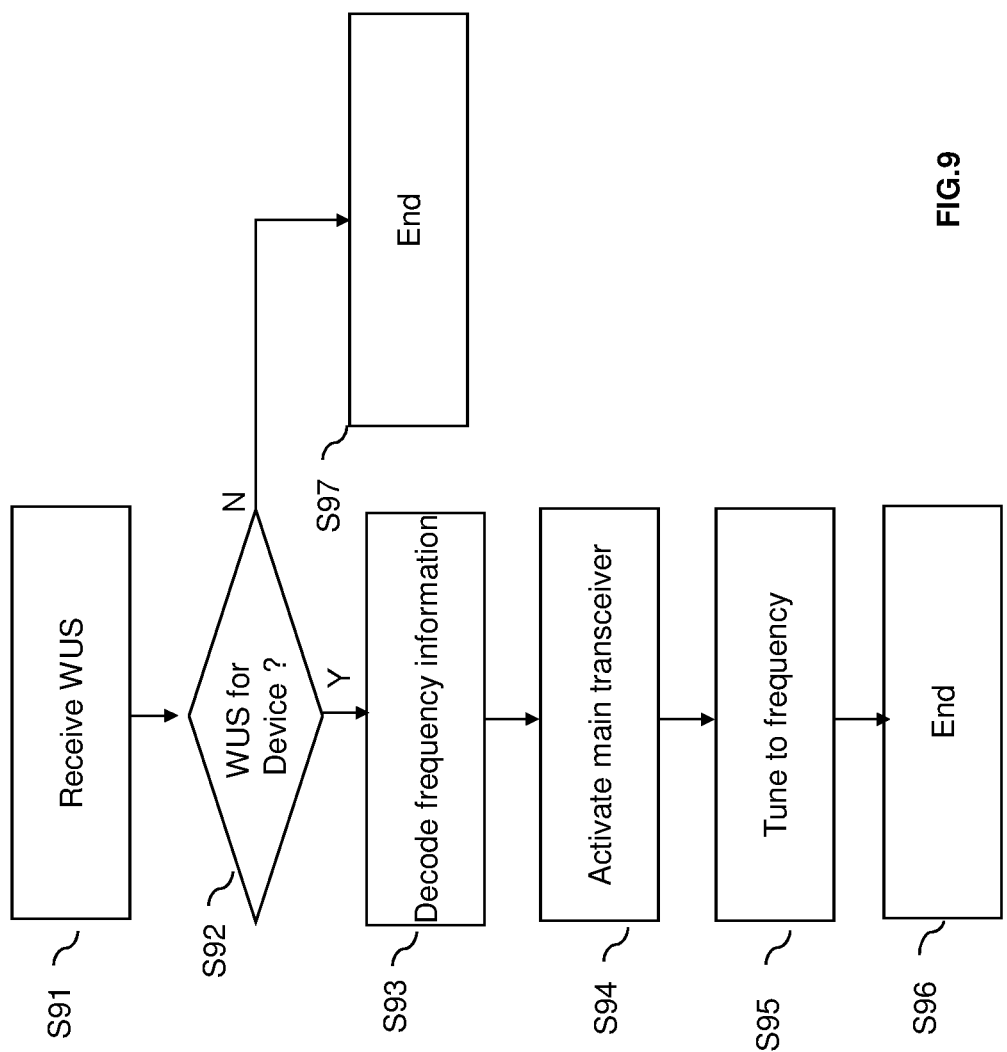
FIG. 9 shows an example flowchart of a method carried out by a target wireless device receiving the wake-up signal with the encoded frequency information.

FIG. 9 summarizes an example flowchart carried out by a target wireless device receiving the wake-up signal transmitted by the first wireless device or access point. In step S91 the target wireless device receives the wake-up signal and in step S92 the target wireless device determines whether it is the intended recipient of the wake-up signal. If this is not the case the method ends in step S97. If the target wireless device however determines that it is a correct recipient of the message the target wireless device decodes the information encoded in the wake-up signal such as the frequency information in step S93. If further pieces of information are present in the wake-up signal such as the point in time or the type of data frame to be received, this information is also decoded by the target wireless device. The wireless device activates the main transceiver in step S94. In step S95 the main receiver then tunes to the frequency as decoded from the frequency information. Step S92 and S93 can be carried out by the wake-up receiver. Furthermore, it is possible that the wake-up receiver completely (or at least partly) decodes the information present in the wake-up signal, for example before activating the main receiver in step S93. When information about the point in time is present in the wake-up signal, this information may be decoded by the wake-up receiver so that the wake-up receiver can start a timer when the main transceiver should be woken up or should be activated (then the decoding of the point in time may happen before step S93). However, it is also possible that the determination of the frequency contained in the wake-up signal and/or the determination of the type of frame is carried out by the main transceiver. The method ends in step S96.

Figure 10:
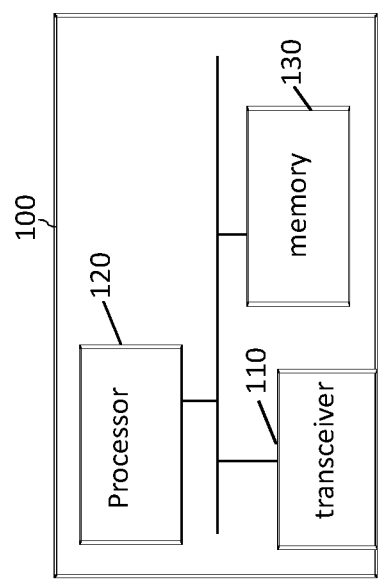
FIG. 10 shows an example schematic representation of the first wireless device which generates the wake-up signal with the encoded frequency information.

FIG. 10 shows a schematic architecture overview over the first wireless device 100. The first wireless device or transmitter or access point 100 comprises a transceiver 110 symbolizing the ability to communicate with other entities inside or outside the wireless network such as the wireless devices 200. The transceiver 110 is used to receive user data or control messages from other entities and is used to transmit user data or control messages to other entities such as the wake-up signal. The first wireless device 100 furthermore comprises a processor 120 comprising one or more processing units which is responsible for the operation of the wireless entity 100. The processor 120 can carry out instructions stored on a memory 130. The memory can include suitable program code to be executed by the processor 120 so as to implement the functionalities in which the first wireless device is involved and as discussed above (for example in connection with FIG. 8) or described in more detail below.

The target wireless device 200 comprises a wake-up receiver 215 which is configured to receive data or control messages from other entities such as the wireless entity 100. As discussed above the wake-up receiver is configured to receive the wake-up signal and decode the information in the wake-up signal in such a way that it can determine whether the received message is intended for the receiving wireless device or not. The wake-up receiver can wake-up a main transceiver 210 which is then responsible for the communication with other entities inside or outside the wireless network. The main transceiver 210 is provided for transmitting the data or control messages to other entities and to receive user data or control messages from other entities. The wireless device 200 furthermore comprises a processor 220 comprising one or more processing units which can carry out instructions stored in a memory 230. The memory 230 can include suitable program code to be executed by the processor 220 so as to implement the above described functionalities in which the wireless device 200 is involved (for example in connection with FIG. 9).

The memory 130, 230 may include a read-only memory, e.g. a flash read only memory, a random access memory, a mass storage such as a hard disk or solid-state disk or the like.

Figure 11:
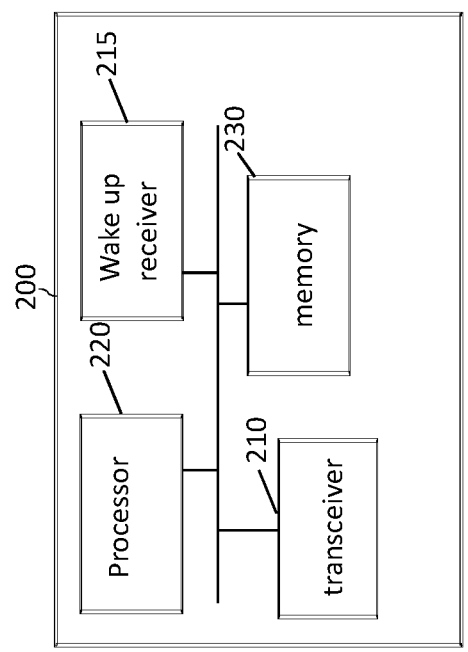
FIG. 11 shows an example schematic representation of the target wireless device receiving the wake-up signal with the encoded frequency information.

It is to be understood that the structures as illustrated in FIGS. 10 and 11 are merely schematic and that the devices shown in these Figures may actually include further components which, for the sake of clarity, have not been illustrated, e.g., further interfaces or processors. Also it is to be understood that the memory may comprise further types of program modules which have not been illustrated, by way of example program modules for implementing known functionalities of a wireless device.

Figure 12:
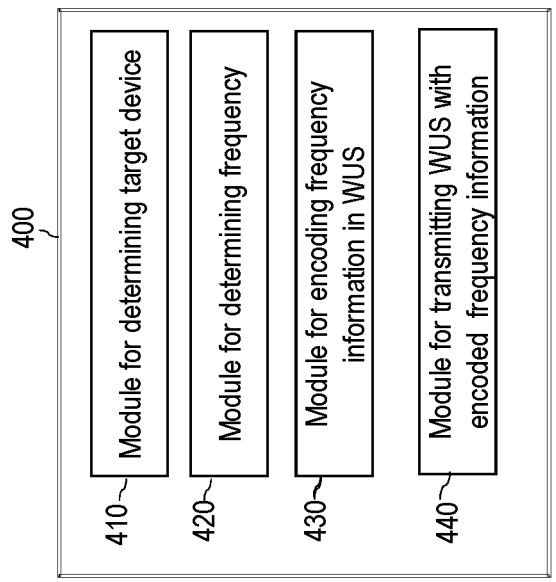
FIG. 12 shows another example schematic representation of the first wireless device generating the wake-up signal with the encoded frequency information.

FIG. 12 shows a further example of a first wireless device or access point 400. The wireless device comprises a module 410 for determining the target wireless device. Furthermore, a module 420 for determining at least the frequency is provided which determines at which frequency a data exchange with the target wireless device should be carried out. The device 400 furthermore comprises a module 430 for encoding the frequency information (plus optionally other information like the point in time or the data frame type) into the wake-up signal and a module 440 for transmitting the wake-up signal with the encoded frequency information.

Figure 13:
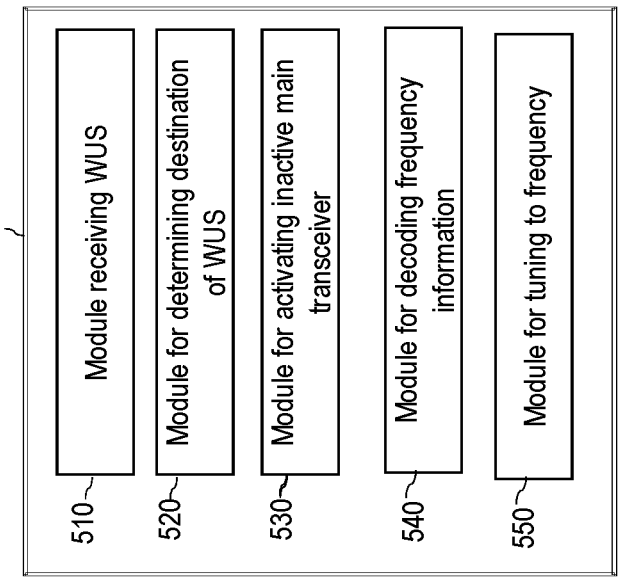
FIG. 13 shows another example schematic representation of the target wireless device receiving the wake-up signal with the encoded frequency information.

In connection with FIG. 13 a further example of a target wireless device 500 is shown. The target wireless device comprises a module 510 configured to receive the wake-up signal with the encoded information. Furthermore, a module 520 is provided for determining the destination of the wake-up signal and for determining whether the received wake-up signal is intended for the receiving wireless device. Furthermore, a module 530 is provided for activating the inactive main transceiver taking into account the information decoded from the wake-up signal. The receiving wireless device furthermore comprises a module 540 for decoding the frequency information and a module 550 for tuning to the decoded frequency. The wireless device 500 is then able to receive and transmit data on the decoded frequency, for example in the decoded frequency band.

The wireless devices 200 and 500 shown in FIGS. 11 and 13 can be narrowband wireless devices which can only scan a fraction of the available frequency band used for the communication in the network between the first wireless device and the target wireless device. THE WLAN channel can be divided into different sub-channels or sub-bands. The narrowband wireless devices can operate in some or all of the sub-bands of the WLAN channel but not at the same time.

The first wireless device 100 or 400 in contrast can be able to communicate and scan in all available frequency bands of the wireless network.

From the above explanation and discussion some general conclusions can be drawn for the first wireless device 100 and 400 and for the target wireless device 200 or 500.

As far as the first wireless device is concerned the frequency information encoded into the wake-up signal may comprise a frequency domain at which the at least one first message that is transmitted to the target wireless device after the wake-up signal to the target wireless device.

In another embodiment it is possible to define a point in time at which the first wireless device will start transmitting the at least first message to the at least one target wireless device 200. Additionally, the first wireless device can encode a time information into the wake-up signal by which the wake-up receiver of the at least one target wireless device is informed about the defined point in time. The wake-up signal can be transmitted by the first wireless device with the encoded time and frequency information to the at least one target wireless device. Here the time information may be encoded as a difference between the transmission time of the wake-up signal and the transmission time of the at least one first message. In another embodiment it is also possible that the time information is encoded as an absolute time.

As far as the encoding of the frequency information is concerned, the frequency may be encoded into the wake-up signal as a value describing an absolute frequency value or as a relative value describing a difference in frequency between the frequency of the wake-up signal and the frequency of the at least one first message.

The first wireless device may also encode into the wake-up signal information which type of data frame or message can be expected as next data frame or message after the wake-up signal.

As far as the target wireless device is concerned, the target wireless device can decode the frequency information by decoding a frequency domain at which the at least one first message will be received.

Furthermore, the target wireless device may decode time information encoded in the wake-up signal by which the target wireless device is informed about a point in time at which the first wireless device will start transmitting the at least one first message. The target wireless device can then set a counter based on the decoded time information and activate the inactive main transceiver based on the activation signal from the counter.

Furthermore, the target wireless device can determine whether information is encoded into the wake-up signal which indicates which type of data frame can be expected as a next data frame in the first message after the wake-up signal. If the wake-up signal then comprises the information about the type of frame, the target wireless device may check for a defined period of time whether the expected type of frame intended for the target wireless device is received.

When the expected type of frame is not received within the defined period of time, the main transceiver may be inactivated again.

In a further embodiment it is possible to check for the defined period of time after the activation of the main transceiver based on the activation signal from the timer whether the expected type of frame is received.

The receiving of the wake-up signal, the determining whether the wake-up signal is intended for the wireless device and the activation of the inactive main transceiver may be carried out by the wake-up receiver of the target wireless device. The decoding of the frequency information and the tuning to the frequency deduced from the frequency information may be carried out by the main transceiver. However, the decoding of the frequency information may also be carried out by the wake-up receiver.

The network in which the different wireless devices communicate with each other can be a wireless local area network, LAN.

The first wireless device may be an access point or a base station. The access point may be a WLAN or Wi-Fi access point supporting narrowband transmission.

The target wireless device may be a mobile wireless device, for example a mobile phone, a laptop, a PDA or a tablet. Furthermore the target wireless device maybe a sensor or an IoT device, which may be mobile or fixed installed.

In summary when a wake-up signal which is enriched by different pieces of information is used, wireless devices can optimize the time at which the main transceiver is turned on and power can be saved as there is no need to tune to different frequency bands or to wake up the main transceiver earlier in order to listen on the available frequency channels. Power can be saved in the long run as uplink scheduling information may also be shared as a part of the wake-up signal which helps the main receiver to sleep longer rather than waiting for the trigger frame to be received. Furthermore, the transmitting wireless device, the access point, may indicate the narrowband beacon transmissions or narrowband trigger frame transmission at a specific time and resource so that the receiving wireless device does not have to search these frames in the frequency and time domain.

The invention claimed is:

1. A method for operating a first wireless device in a wireless network, the method comprising:
   determining at least one target wireless device which should receive a wake up signal by which a wake up receiver of the at least one target wireless device is informed that a main transceiver of the target wireless device should be ready for receiving at least a first message from the first wireless device;
   determining a frequency at which the at least first message should be transmitted to the at least one target wireless device;
   encoding a frequency information into the wake up signal with which at least one target wireless device is informed about the frequency at which the at least first message will be received; and
   transmitting the wake up signal with the encoded frequency information to the at least one target wireless device.

2. The method of claim 1, wherein the frequency information comprises a frequency domain at which the at least first message will be transmitted to the at least one target wireless device.

3. The method of claim 1, further comprising:
   defining a point in time at which the first wireless device will start transmitting the at least first message to the at least one target wireless device;
   encoding a time information into the wake up signal by which the wake up receiver of the at least one target wireless device is informed about the defined point in time; and
   transmitting the wake up signal including the encoded time and frequency information to the at least one target wireless device.

4. The method of claim 3, wherein the time information is encoded as a difference between a transmission time of the wake up signal and the transmission time of the at least one first message.

5. The method of claim 1, wherein the frequency is encoded into the wake up signal as a value describing an absolute frequency value, and/or wherein the frequency is encoded into the wake up signal as a relative value describing a difference in frequency between the frequency of the wake up signal and the frequency of the at least one first message.

6. The method of claim 1, further encoding into the wake up signal information which type of data frame is expected as a next data frame in the first message after the wake up signal.

7. A method for operating a target wireless device in a wireless network, the method comprising:
   receiving a wake up signal from a first wireless device of the wireless network;
   determining whether the received wake up signal is intended for the target wireless device receiving the wake up signal;
   responsive to determining that the received wake up signal is intended for the target wireless device receiving the wake up signal, activating the inactive main transceiver of the target wireless device;
   responsive to determining that the received wake up signal is intended for the target wireless device receiving the wake up signal, decoding a frequency information present in the wake up signal by which the target wireless device is informed about the frequency at which at least a first message will be received from the first wireless device; and
   responsive to determining that the received wake up signal is intended for the target wireless device receiving the wake up signal, tuning the main transceiver to the frequency deduced from the frequency information.

8. The method of claim 7, wherein decoding frequency information comprises decoding a frequency domain at which the at least first message will be received.

9. The method of claim 7, further comprising:
   decoding time information encoded in the wake up signal by which the target wireless device is informed about a point in time at which the first wireless device will start transmitting the at least one message;
   setting a counter of the target wireless device based on the decoded time information; and
   activating the inactive main transceiver based on an activation signal from the counter.

10. The method of claim 7, further comprising:
    determining whether information is encoded into the wake up signal indicating which type of data frame is expected as a next data frame in the first message after the wake up signal;
    responsive to determining that the information is encoded into the wake up signal indicating which type of data frame is expected as the next data frame in the first message after the wake up signal, checking for a defined period of time whether the expected type of frame intended for the target wireless device is received; and responsive to the expected type of frame not being received within the defined period of time, inactivating the main transceiver.

11. A first wireless device of a wireless network, the first wireless device comprising:

processing circuitry; and memory coupled to the processing circuitry and having instructions stored therein that are executable by the processing circuitry to cause the first wireless device to perform operations comprising:

determining at least one target wireless device which should receive a wake up signal by which a wake up receiver of the at least one target wireless device is informed that a main transceiver of the target wireless device should be ready for receiving at least a first message from the first wireless device;

determining a frequency at which the at least first message should be transmitted to the at least one target wireless device;

encoding a frequency information into the wake up signal with which at least one target wireless device is informed about the frequency at which the at least first message will be received; and transmitting the wake up signal with the encoded frequency information to the at least one target wireless device.

12. The first wireless device of claim 11, wherein the frequency information comprises a frequency domain at which the at least first message will be transmitted to the at least one target wireless device.

13. The first wireless device of claim 11, the operations further comprising:

defining a point in time at which the first wireless device will start transmitting the at least first message to the at least one target wireless device;

encoding a time information into the wake up signal by which the wake up receiver of the at least one target wireless device is informed about the defined point in time; and transmitting the wake up signal including the encoded time and frequency information to the at least one target wireless device.

14. The first wireless device of claim 13, wherein the first wireless device is operative to encode the time information as a difference between a transmission time of the wake up signal and the transmission time of the at least one first message.

15. The first wireless device of claim 11, wherein the first wireless device is operative to encode the frequency into the wake up signal as a value describing an absolute frequency value, or wherein the first wireless device is operative to encode the frequency into the wake up signal as a relative value describing a difference in frequency between the frequency of the wake up signal and the frequency of the at least one first message.

16. The first wireless device of claim 11, wherein the first wireless device is operative to encode into the wake up signal information which type of data frame is expected as a next data frame in the first message after the wake up signal.

17. A target wireless device operating in a wireless network, the target wireless device comprising:

processing circuitry; and memory coupled to the processing circuitry and having instructions stored therein that are executable by the processing circuitry to cause the first wireless device to perform operations comprising:

receiving a wake up signal from a first wireless device of the wireless network;

determining whether the received wake up signal is intended for the target wireless device receiving the wake up signal;

responsive to determining that the received wake up signal is intended for the target wireless device receiving the wake up signal, activating the inactive main transceiver of the target wireless device;

responsive to determining that the received wake up signal is intended for the target wireless device receiving the wake up signal, decoding a frequency information present in the wake up signal by which the target wireless device is informed about the frequency at which at least a first message will be received from the first wireless device; and responsive to determining that the received wake up signal is intended for the target wireless device receiving the wake up signal, tuning the main transceiver to the frequency deduced from the frequency information.

18. The target wireless device of claim 17, the operations further comprising:

decoding frequency information to decode a frequency domain at which the at least first message will be received.

19. The target wireless device of claim 17, the operations further comprising:

decoding time information encoded in the wake up signal by which the target wireless device is informed about a point in time at which the first wireless device will start transmitting the at least one message;

setting a counter of the target wireless device based on the decoded time information; and activating the inactive main transceiver based on an activation signal from the counter.

20. The target wireless device of claim 17, the operations further comprising:

determining whether information is encoded into the wake up signal indicating which type of frame is expected to be received in the at least first message as a next data frame;

responsive to determining that the information is encoded into the wake up signal indicating which type of frame is expected to be received in the at least first message as the next data frame, checking for a defined period of time whether the expected type of frame intended for the target wireless device is received; and responsive to the expected type of frame not being received within the defined period of time, inactivating the main transceiver.

21. The target wireless device of claim 20, the operations further comprising:

checking for the defined time period after activation of the main transceiver whether the expected type of frame is received.

22. The target wireless device of claim 17, the operations further comprising:

receiving the wake up signal;

determining whether the wake up signal is intended for the target wireless device; and activating the inactive main transceiver.

23. The target wireless device of claim 17, the operations further comprising:
   decoding the frequency information; and
   tuning to the frequency deduced from the frequency information.

24. The target wireless device of claim 17, further being configured as a narrowband wireless device configured to only scan a fraction of the available frequency band and not the whole available frequency band used in the wireless network for communication between the first wireless device and the target wireless device.

* * * * *